United States Patent [19]

Tippmann et al.

[11] Patent Number: 5,421,246
[45] Date of Patent: Jun. 6, 1995

[54] ENCLOSURE HAVING A RACK FOR HEATING OR COOLING FOOD PRODUCTS

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 215,714
[22] Filed: Mar. 22, 1994
[51] Int. Cl.⁶ ............................................. A23L 1/00
[52] U.S. Cl. .................................... 99/448; 99/450; 99/470; 99/476; 165/918; 34/194; 34/196
[58] Field of Search ................ 99/470, 476, 474, 473, 99/483, 448, 450; 165/918, 919, 48.1, 104.26; 34/194, 196, 197, 198, 200; 126/21 R, 21 A; 62/252, 253, 520, 521, 522; 211/186, 188, 194

[56] References Cited

U.S. PATENT DOCUMENTS

| | | | |
|---|---|---|---|
| 2,507,891 | 5/1950 | David | 34/194 |
| 2,642,860 | 6/1953 | Hunter et al. | 34/197 |
| 4,249,482 | 2/1981 | Harr | 34/196 |
| 4,329,789 | 5/1982 | Erickson | 99/483 |
| 5,086,693 | 2/1992 | Tippmann | 99/448 |
| 5,245,159 | 9/1993 | Chang | 99/474 |

*Primary Examiner*—David A. Scherbel
*Assistant Examiner*—Reginald L. Alexander
*Attorney, Agent, or Firm*—Joseph J. Baker

[57] ABSTRACT

An enclosure is disclosed for heating or cooling food products on a pan. The enclosure preferably has transparent side walls, a closure member and a rack comprising a plurality of vertically spaced-apart pan supports each comprised of a plurality of interconnected tubular fluid carrying members, each support is maintained in spaced-apart relationship by fluid carrying conduits which communicate with the tubular members to thereby transfer heated or cooled fluid between supports from a fluid supply inlet to a fluid discharge outlet.

12 Claims, 3 Drawing Sheets

ENCLOSURE HAVING A RACK FOR HEATING OR COOLING FOOD PRODUCTS

BACKGROUND OF THE INVENTION

This invention relates to a display enclosure for food products having a rack of vertically, spaced-apart supports for pans holding the food products and through and between which supports a heated or cooled transfer fluid can be circulated.

SUMMARY OF THE INVENTION

There has long been a need for a case or enclosure of the present invention which can be placed, for example, on a counter top or the like for displaying for sale various kinds of food products and in which the food products can be chilled, warmed, or cooked. The case of the present invention has a plurality of spaced-apart supports on which pans containing the food product can be placed. The side walls are transparent so the food can be observed to thereby encourage people to buy it. The supports are capable of circulating a fluid for transferring heat or cold from a source through pans to the food product. The supports are maintained in their spaced-apart relationship by means of conduits located preferably on the corners of the supports. The conduits are capable of transferring the fluid between the supports and thus serve a dual function. The corners of the enclosure are typically rectangular shaped in cross-section and provide an area to which the transparent walls can be attached. The conduits are typically located at the four corners of the support and thus can be hidden within the corners to thereby provide an unobstructed view of the food on the pans. An inlet is provided typically adjacent the bottom support and an outlet would be provided adjacent the top so that heated or cooled transfer fluid, typically water, could be circulated through the inlet, across and between each vertical support and out the outlet.

In a second embodiment, an enclosure is set forth for warming or cooking food products by conduction, as set forth in our U.S. Pat. No. 5,086,693. A source of heated water can be provided and secured at the top of the enclosure. This source would typically have a pump for circulating the heated transfer fluid through the supports and interconnecting conduits.

In a third embodiment, a source of cool or chilled water can be provided by a refrigeration system located beneath the enclosure to cool food products by conduction. Again, this source would typically have a pump for circulating cooled transfer fluid through the supports and interconnecting conduits.

It is, therefore, the primary object of the present invention to provide a superior display enclosure in which food products can be chilled, warmed or cooked by conduction.

It is another object of the present invention to provide a display enclosure for food having a rack of spaced-apart supports which are capable of transferring heat or cold to food carrying pans placed thereon.

It is a further object of the present invention to provide a display enclosure for food wherein the supports for pan carrying food products are maintained in their spaced-apart relationship by hidden, fluid carrying conduits.

It is a still further object of the present invention to provide a display enclosure which, due to its unique construction, gives a substantially unobstructed viewing of the food contained therein.

It is yet another object of the present invention to provide an enclosure and rack for displaying food products which is thermally efficient in its operation and relatively simple and inexpensive in its construction.

Other objects and advantages of the present invention will become apparent and obvious from a study of the following description and accompanying drawings, which are merely illustrative of the present invention.

DETAILED DESCRIPTION OF PREFERRED EMBODIMENTS

Figure 1:
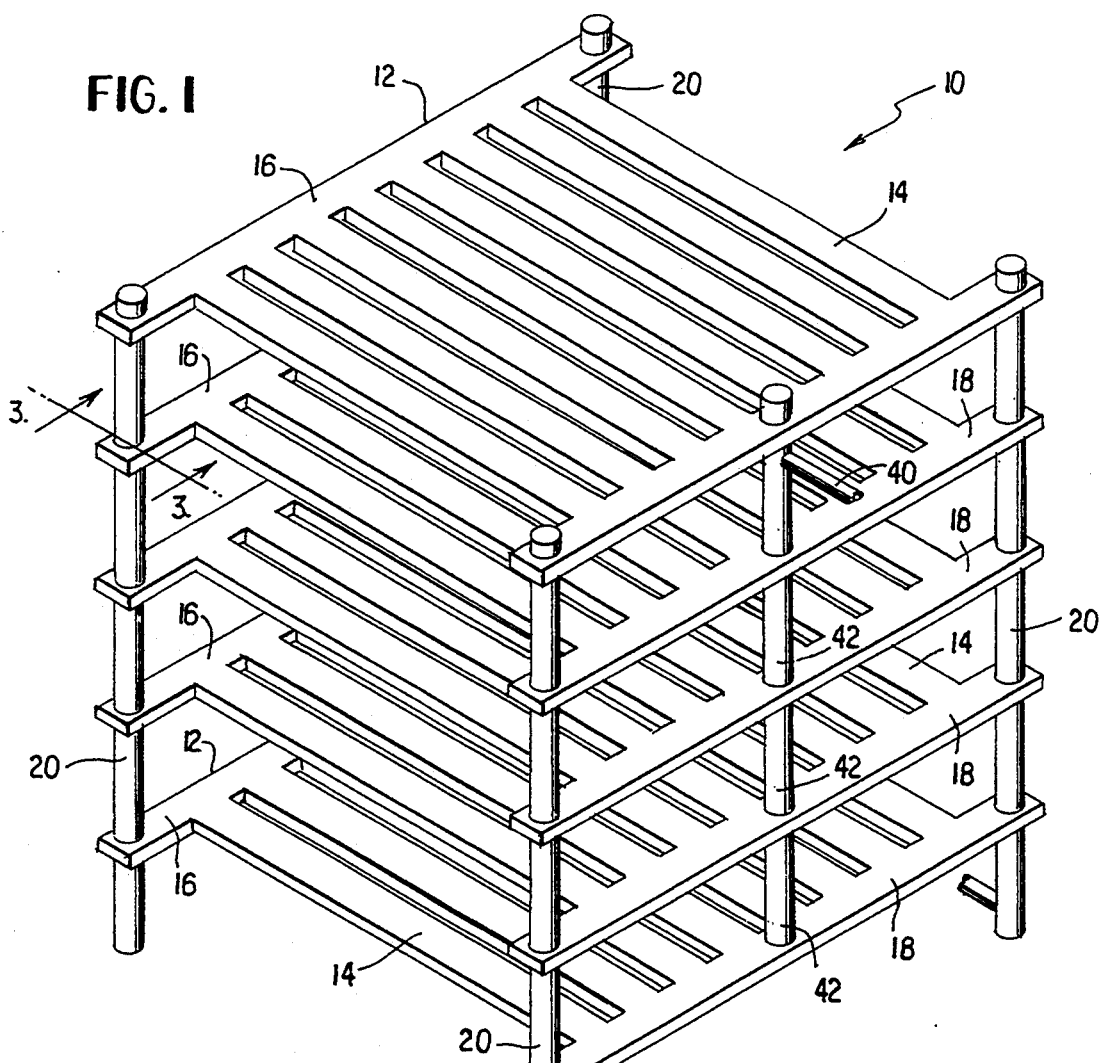
FIG. 1 is a perspective view of the rack of the present invention.

Referring now to the drawings where like characters of reference indicate like elements in each of the several views, numeral 10 refers generally to the rack used in the enclosure of the present invention for chilling, warming and cooking of food products by conduction in a display environment.

The rack 10, shown in FIG. 1, comprises a plurality of vertically spaced-apart pan supports 12. Each pan support 12 consists of a plurality of spaced-apart tubular members 14, each tubular member having one end thereof connected in sealed, fluid transfer relationship with a first plenum 16 and the other end thereof connected in sealed, fluid transfer relationship to a second plenum 18. The plenums 16, 18 and tubular members 14 serve to provide a planer support surface on which a pan (not shown) containing food products can be cooled, warmed or cooked by conductive thermal transfer of heat or cold between the support surface thus created and the pan.

Figure 2:
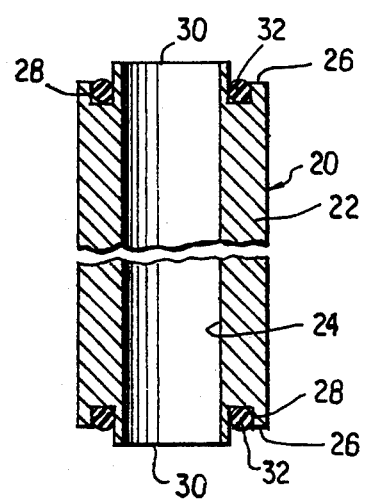
FIG. 2 is an enlarged view in cross-section of a conduit for carrying fluid.

The pan supports 12 are maintained in their vertical, spaced-apart relationship by means of conduits 20 arranged adjacent the end portions of plenums 16, 18. Each conduit 20, as shown in FIG. 2, consists of a hollow, tubular body portion 22 preferably made of metal or molded plastic and having a fluid transfer passageway 24. The conduit 20 has an end 26 in which is formed a cylindrical shaped recess 28. A circular-shaped lip 30 is formed integral with the main body portion 22 and extends a distance beyond the end 26 and adjacent the recess 28. A conventional O-ring seal 32 is positioned in the recess 28 adjacent the lip 30 and extends a distance beyond the end 26.

Figure 3:
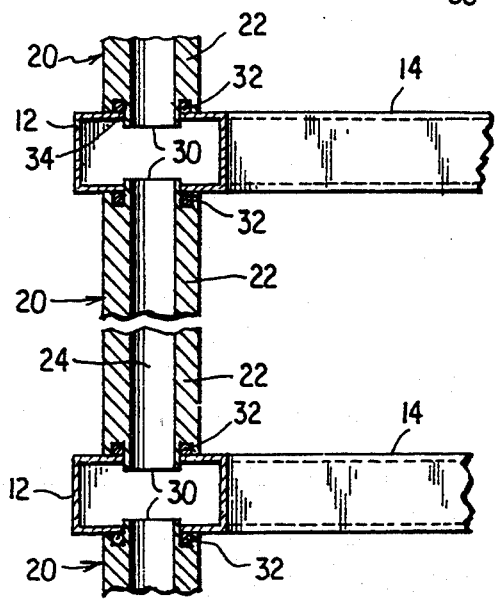
FIG. 3 is a cross-sectional view taken along lines 2—2 of FIG. 1.

Referring now to FIG. 3, the plenums 16, 18 have circular recesses 34 formed in the ends thereof and are of a diameter slightly greater than the outside diameter of lip 30 of conduits 20. When in position, the lips 30 are located in the recesses 34 to thereby maintain the supports 12 in parallel, spaced-apart relationship to each other. Engagement of the end 26 of each conduit 20 with a respective outer surface of plenums 16, 18 causes the O-ring seal 32 to compress thereby ensuring a watertight seal between the plenums 16, 18 and the conduits 20 for a transfer fluid circulated through the plenums 16, 18, tubular members 14 and conduits 20. An inlet pipe 36 is provided in communication with a conduit end section 38 for supplying transfer fluid to the plenums 18 and an outlet pipe 40 connected to one of a plurality of return conduits 42 interconnected between plenums 16 to thereby ensure that transfer fluid entering the inlets 36 will flow through all plenums 16, 18, tubular members 14 and conduits 20 before exiting outlet 38. It is to be understood, of course, that the inlet pipe 36 and outlet pipe 40 can be connected at any conduit 20 in the rack configuration to ensure the even and balanced flow of transfer fluid through the various plenums 16, 18 and tubular members 14 of each level of the rack 10.

Figure 4:
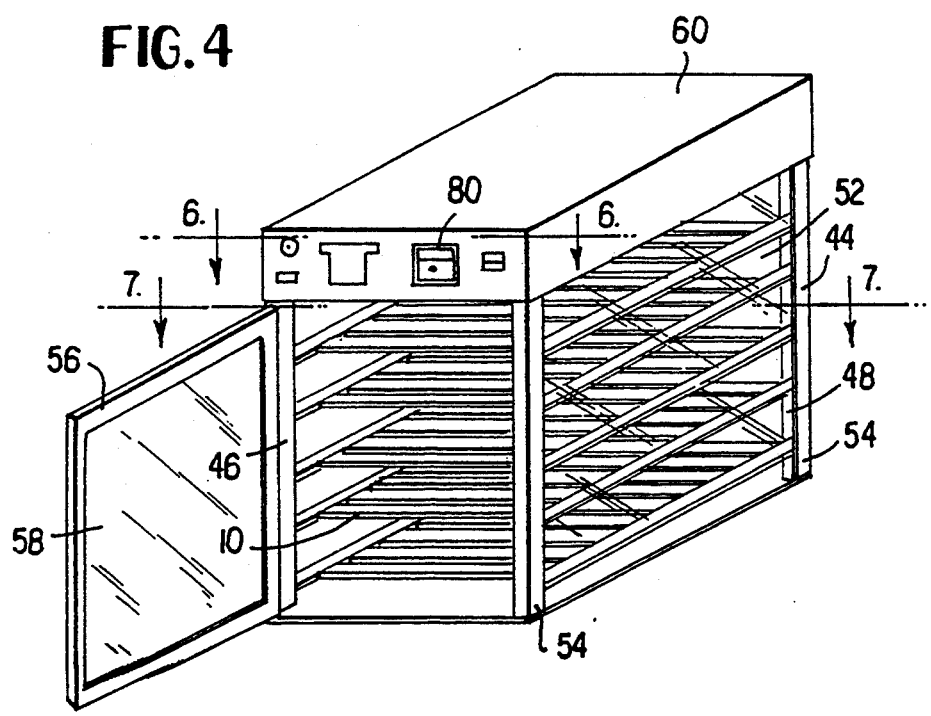
FIG. 4 is a perspective view of a display enclosure of the present invention having a source of heated transfer fluid thereon.
Figure 5:
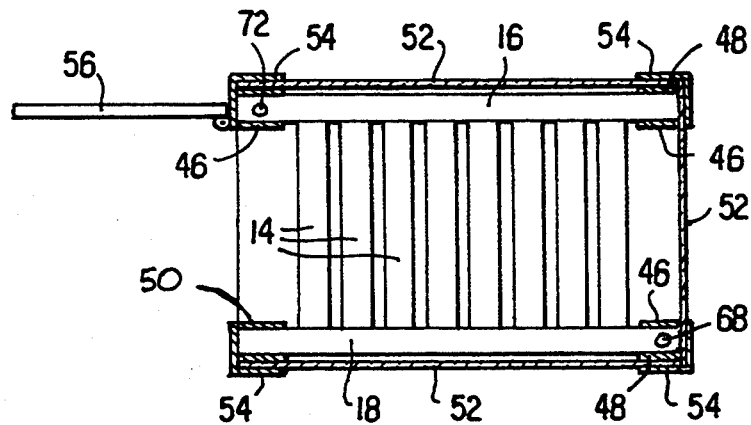
FIG. 5 is a cross-sectional view taken along lines 5—5 of FIG. 4.
Figure 6:
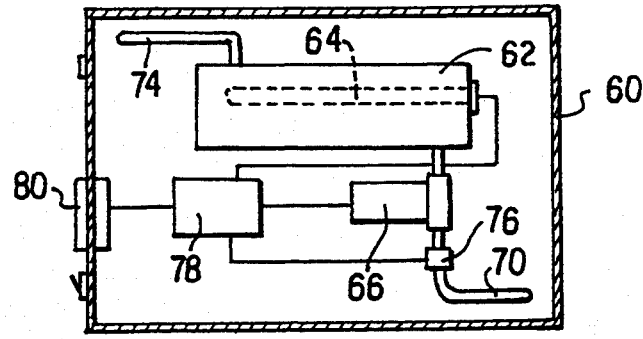
FIG. 6 is a cross-sectional view taken along lines 6—6 of FIG. 4.

Referring now to FIGS. 4, 5 and 6, there is shown in FIG. 4 an enclosure 44 employing the rack 10 for displaying food products on pans (not shown) while at the same time maintaining the food products in a closed thermal environment whether they are being warmed or cooked. The enclosure 44 comprises essentially a rack 10, the conduits 20 of which are enclosed by L-shaped corner members 46, 48. The longitudinal edges of each corner member 46, 48 abut to form a rectangular-shaped tubular member 50 for enclosing the vertically extending conduits 20. Panels 52 of glass, plastic, or other transparent material are positioned between tubular members 50 and maintained adjacent thereto by L-shaped corner cover members 54. A closure member 56 is provided having a central portion 58 also of glass, plastic or other transparent material to permit access to the interior of the enclosure 44. Heated transfer fluid can be supplied to the rack 10 within the enclosure 44 from an external source (not shown) to warm or cook food products placed thereon or it can be provided by self-contained unit 60 mounted on top of the enclosure 44 and secured to tubular members 50 and corner cover members 54. The unit 60 comprises generally a reservoir 62 for holding a quantity of transfer fluid, normally water or a mixture of water and glycol. The transfer fluid is heated by means of a resistance element 64 to either a warming temperature or a temperature for cooking the food products by conduction, as set forth in our aforementioned U.S. patent. The transfer fluid is then circulated through the rack 10 by means of a pump 66 connected between the reservoir 62 and inlet pipe 68 by means of piping 70. The transfer fluid is returned from rack 10 by way of outlet pipe 72 and piping 74. A control valve 76 can also be provided between the pump 66 and inlet pipe 68 to control fluid flow through the rack 10. An electronic control unit 78 is also provided for controlling energization of the heating element 64, pump 66 and control valve 76 in response to the sensed temperature of the pan supports 12 of rack 10 and a predetermined temperature set on controller 80 connected thereto.

Figure 7:
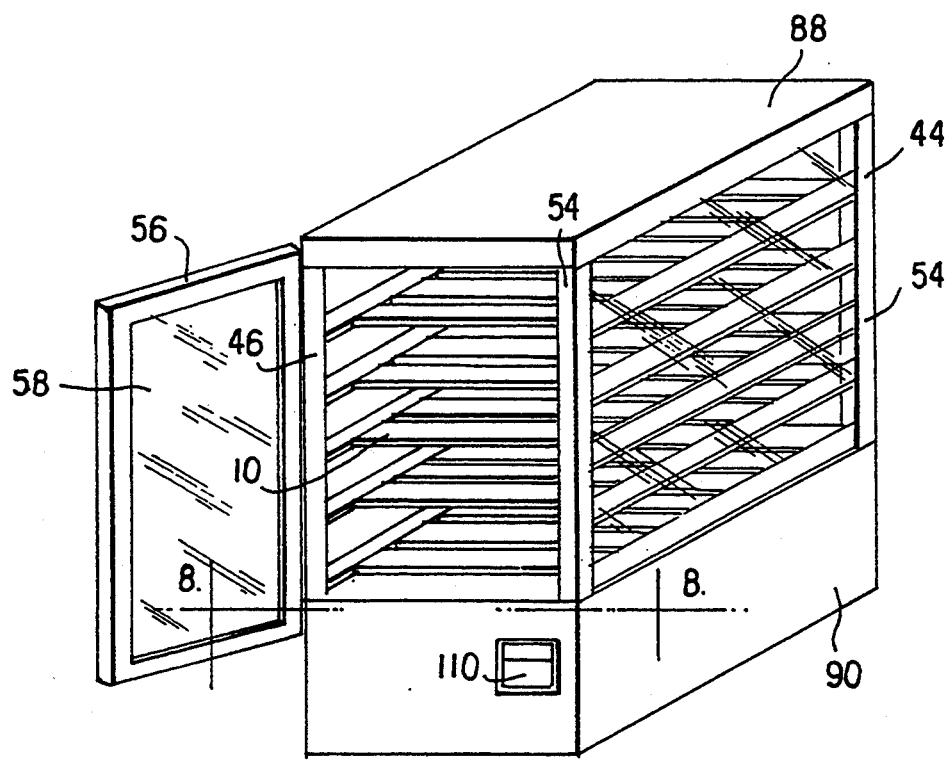
FIG. 7 is a perspective view of a display enclosure of the present invention having a source of cooled transfer fluid therebeneath.
Figure 8:
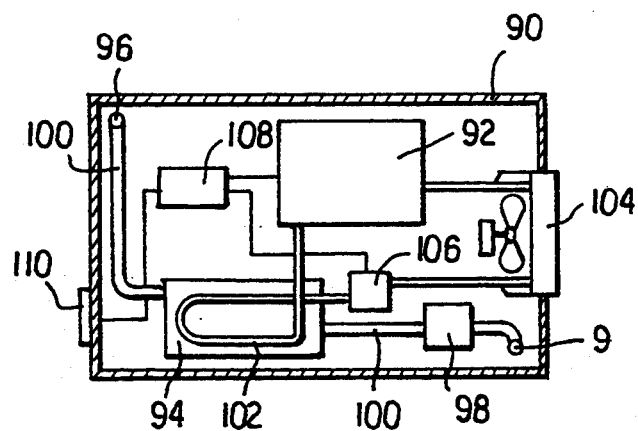
FIG. 8 is a cross-sectional view taken along lines 8—8 of FIG. 7.

FIGS. 7 and 8 set forth another embodiment of enclosure 44 for cooling food products placed on pans (not shown). In the embodiment of FIG. 7, a top member 88 is provided secured to L-shaped members 46, 48 and corner members 54. The enclosure 44 with its rack 10 is positioned on a base 90 containing a refrigeration compressor 92. A reservoir 94 is also provided for holding a quantity of transfer fluid of water or a brine solution. The transfer fluid is circulated from an inlet 95 through the rack 10 to an outlet 96 by means of a pump 98 and piping 100. An evaporator coil 102 is located in the reservoir 94 surrounded by the transfer fluid and is connected, as a conventional refrigeration system, to the compressor 92 via a condensing coil 104 and an expansion valve 106. A control unit 108 is provided which responds to the predetermined temperature set on controller 110 and actuates expansion valve 106 to thereby regulate the temperature of the transfer fluid and ultimately pan supports 12.

It is to be understood, of course, that the rack 10 can be used by itself to support pans of food products without the use of an enclosure 44 by, for example, placing it free-standing in a walk-in cooler.

Applicants have thus described in detail their rack and enclosure for cooling, warming or cooking of food products by conduction which employs a novel conduit system for both maintaining the pan supports in vertical, spaced-apart relationship but also provide a means which can transmit a transfer fluid between pan supports.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A rack for cooling or warming food products on pans, said rack comprising:
   (a) a plurality of vertically spaced-apart pan support means having fluid carrying passageways therethrough,
   (b) conduit means extending between said pan support means for maintaining each of said pan support means in spaced-apart relationship, said conduit means being detachably secured to said pan support means and serving to interconnect said passageways of adjacent pan support means in fluid conductive relationship, and
   (c) inlet means for connecting at least one of said pan support means to a source of hot or cold transfer fluid and an outlet means connected to at least one of said pan support means for removing said transfer fluid after its passage through said support means and said conduit means.

2. A rack as set forth in claim 1 wherein each of said pan support means includes a plurality of spaced-apart tubular members, each tubular member having one end thereof connected to a first plenum and the other end thereof connected to a second plenum, said first and second plenums and each of said tubular members engaging said respective food carrying pan in thermal conductive relationship.

3. A rack as set forth in claim 1 further comprising:
   (a) means for enclosing said rack for maintaining a thermal atmosphere between said pan support means, and
   (b) closure means to provide access to said pan support means.

4. A rack as set forth in claim 3 further comprising means adjacent said enclosure means for providing a source of heated or cooled transfer fluid, and means for circulating said transfer fluid through said pan support means from said inlet to said outlet means.

5. A rack as set forth in claim 3 wherein said enclosure means is substantially transparent.

6. A rack for cooling or warming food products on pans, said rack comprising:
(a) a plurality of vertically spaced-apart pan support means having fluid carrying passageways therethrough,
(b) conduit means extending between said pan support means for maintaining each of said pan support means in spaced-apart relationship, said conduit means serving to interconnect said passageways of adjacent pan support means in fluid conductive relationship and each of said conduit means having a circular-shaped lip adjacent each end thereof defining a fluid passageway therethrough and an O-ring seal positioned adjacent said lip, and
(c) inlet means for connecting at least one of said pan support means to a source of hot or cold transfer fluid and an outlet means connected to at least one of said pan support means for removing said transfer fluid after its passage through said support means and said conduit means.

7. A rack as set forth in claim 6 wherein said pan support means have fluid transfer recesses formed therein and said lip of said conduit means resides in said recess and said O-ring seal abuts said pan support means to ensure a fluid tight seal therebetween.

8. An enclosure for cooling or warming food products on pans, said enclosure comprising:
(a) a chamber having at least two vertically upstanding, spaced-apart side walls and adjacent top and bottom walls, and at least one closure member permitting access to said chamber,
(b) rack means in said chamber having a plurality of vertically spaced-apart pan support means having fluid carrying passageways,
(c) conduit means extending between said pan support means for maintaining each of said pan support means in spaced-apart relationship, said conduit means being detachably secured to said pan support means and serving to interconnect said passageways of adjacent pan support means in fluid conductive relationship, and
(d) inlet means for connecting at least one of said pan support means to a source of hot or cold transfer fluid and an outlet means connected to at least one of said pan support means for removing said transfer fluid after its passage through said support means and said conduit means.

9. An enclosure as set forth in claim 8 wherein each of said pan support means includes a plurality of spaced-apart tubular members, each tubular member having one end thereof connected to a first plenum and the other end thereof connected to a second plenum, said first and second plenums and each of said tubular members engaging said respective food carrying pan in thermal conductive relationship.

10. An enclosure as set forth in claim 8 wherein said side walls and said closure member are transparent.

11. An enclosure for cooling or warming food products on pans, said enclosure comprising:
(a) a chamber having at least two vertically upstanding, spaced-apart side walls and adjacent top and bottom walls, and at least one closure member permitting access to said chamber,
(b) rack means in said chamber having a plurality of vertically spaced-apart pan support means having fluid carrying passageways,
(c) conduit means extending between said pan support means for maintaining each of said pan support means in spaced-apart relationship, said conduit means serving to interconnect said passageways of adjacent pan support means in fluid conductive relationship and each of said conduit means having a circular-shaped lip adjacent each end thereof defining a fluid passageway therethrough and an O-ring seal positioned adjacent said lip, and
(d) inlet means for connecting at least one of said pan support means to a source of hot or cold transfer fluid and an outlet means connected to at least one of said pan support means for removing said transfer fluid after its passage through said support means and said conduit means.

12. An enclosure as set forth in claim 11 wherein said pan support means have fluid transfer recesses formed therein and said lip of said conduit means resides in said recess and said O-ring seal abuts said pan support means to ensure a fluid tight seal therebetween.

* * * * *